June 4, 1968
R. L. TRAPP
3,386,242
ENGINE
Filed Oct. 23, 1965
6 Sheets-Sheet 1
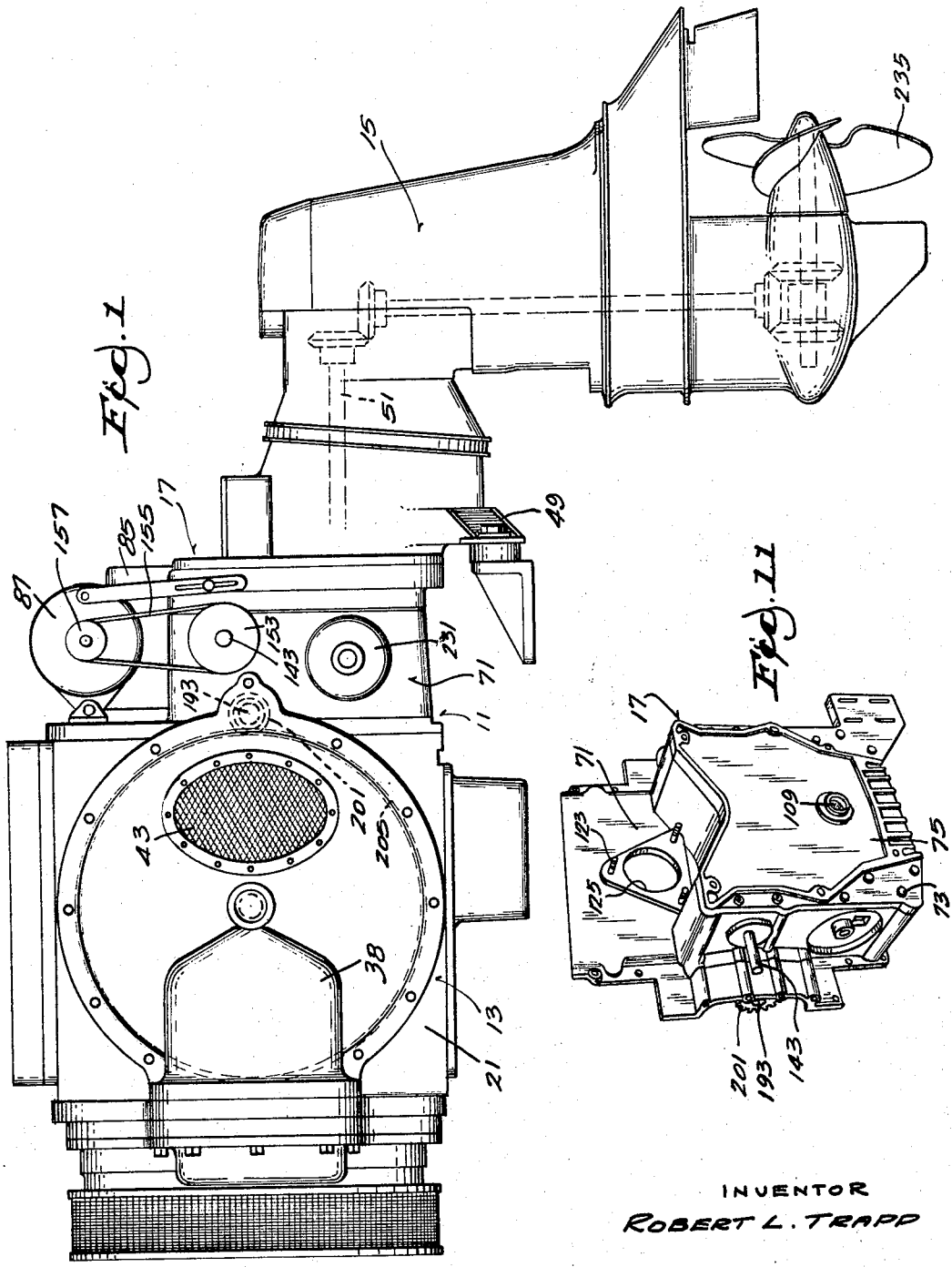
INVENTOR
ROBERT L. TRAPP
BY Wheeler, Wheeler & Wheeler
ATTORNEYS

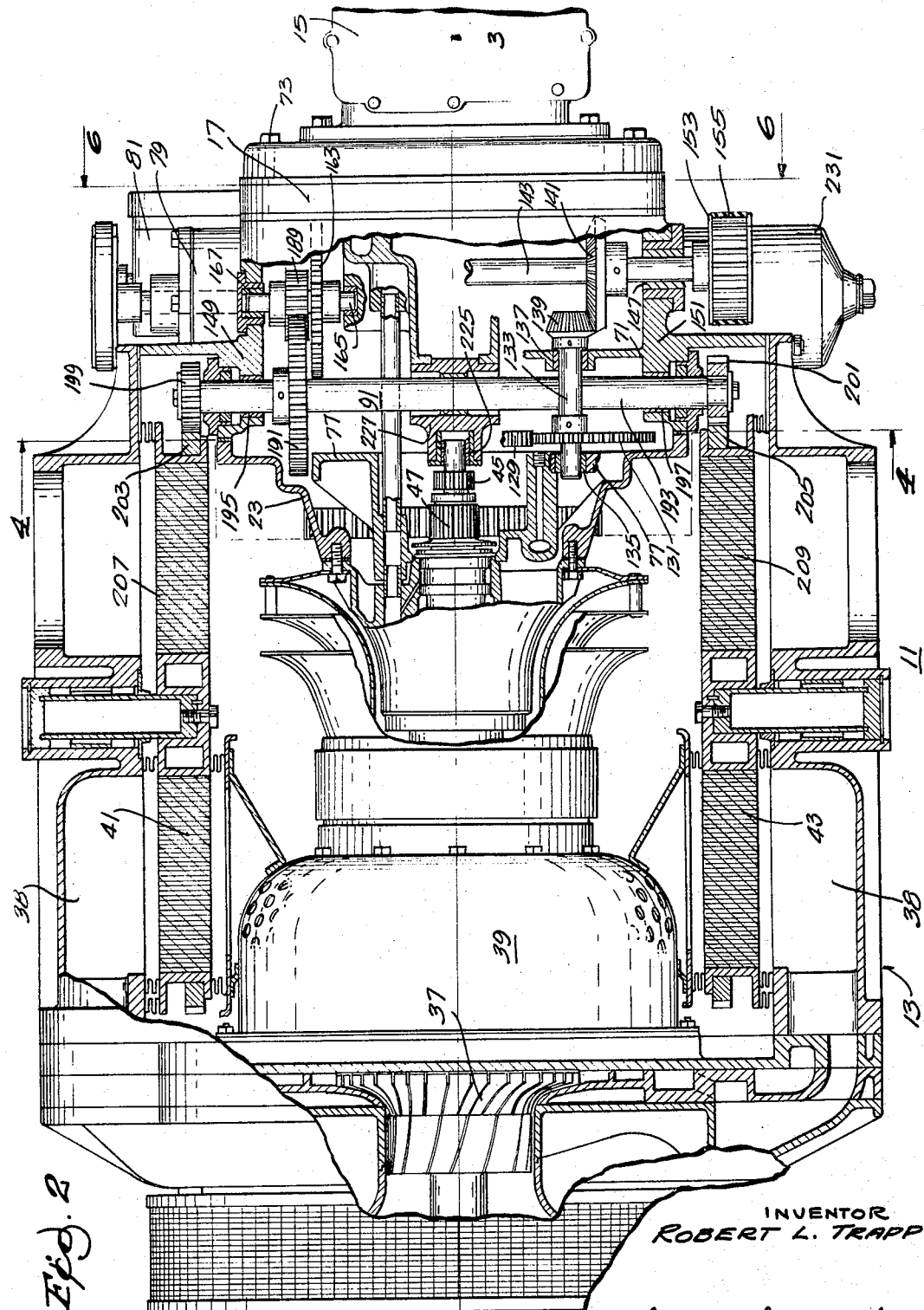

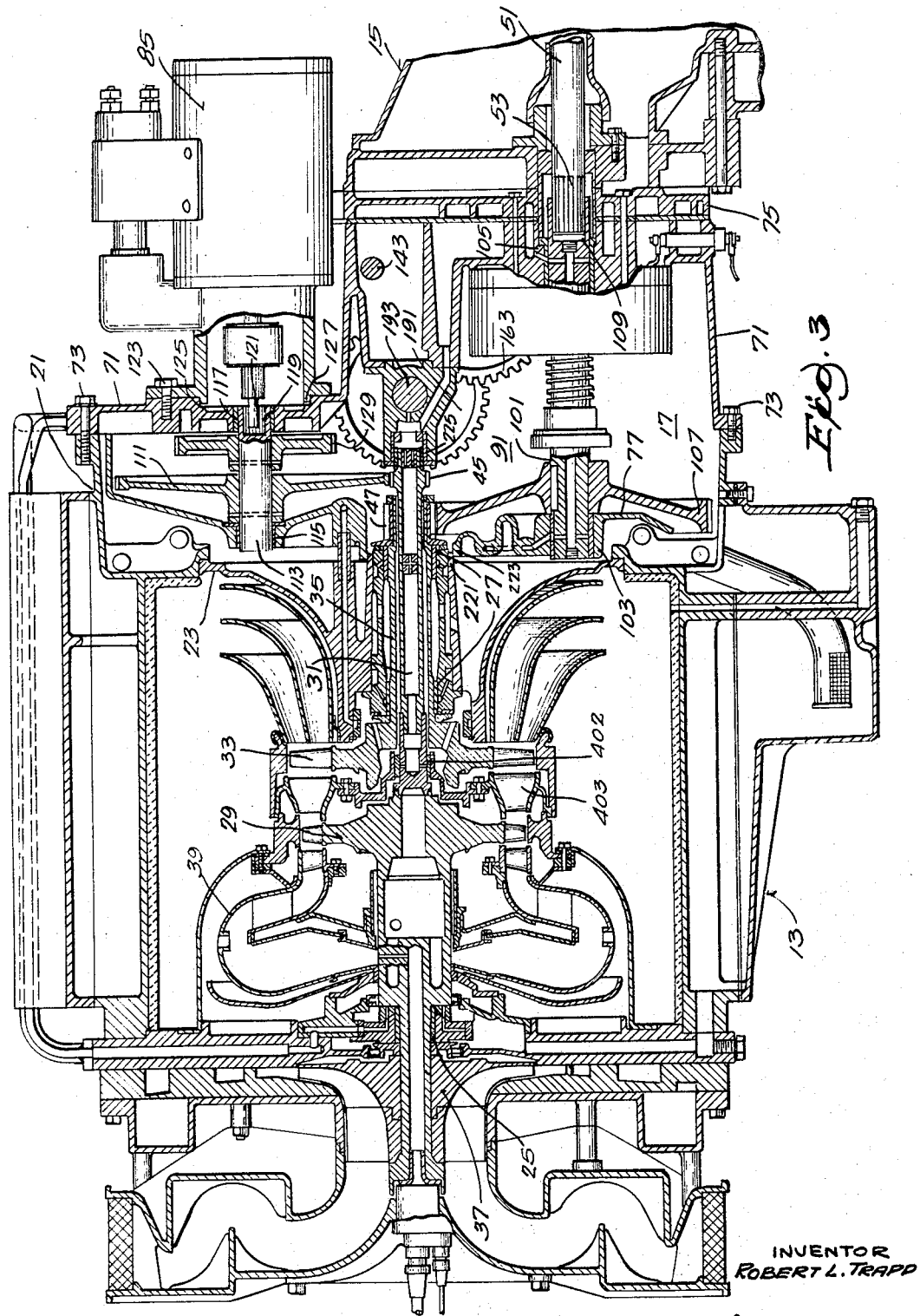

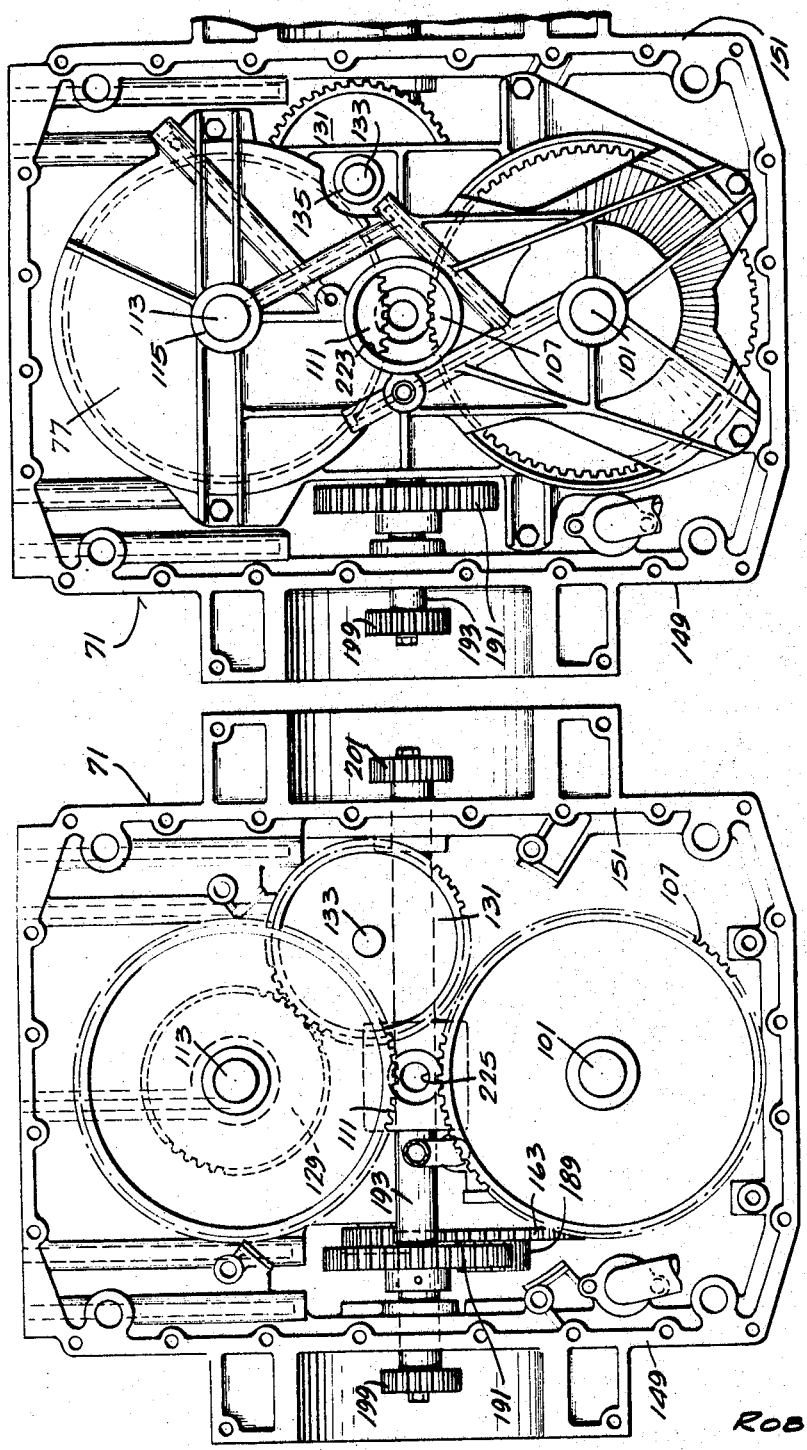

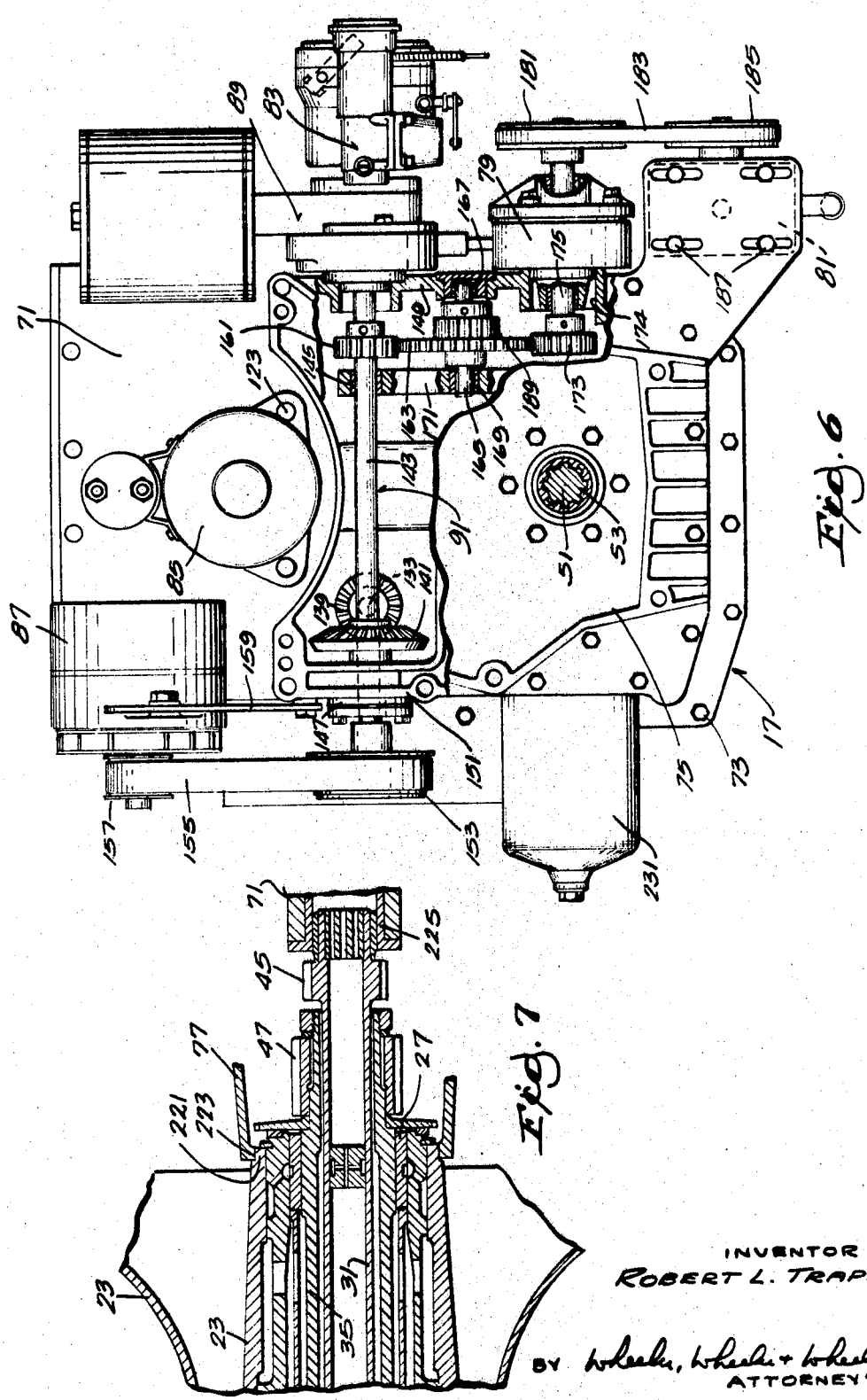

June 4, 1968  R. L. TRAPP  3,386,242
ENGINE
Filed Oct. 23, 1965  6 Sheets-Sheet 6
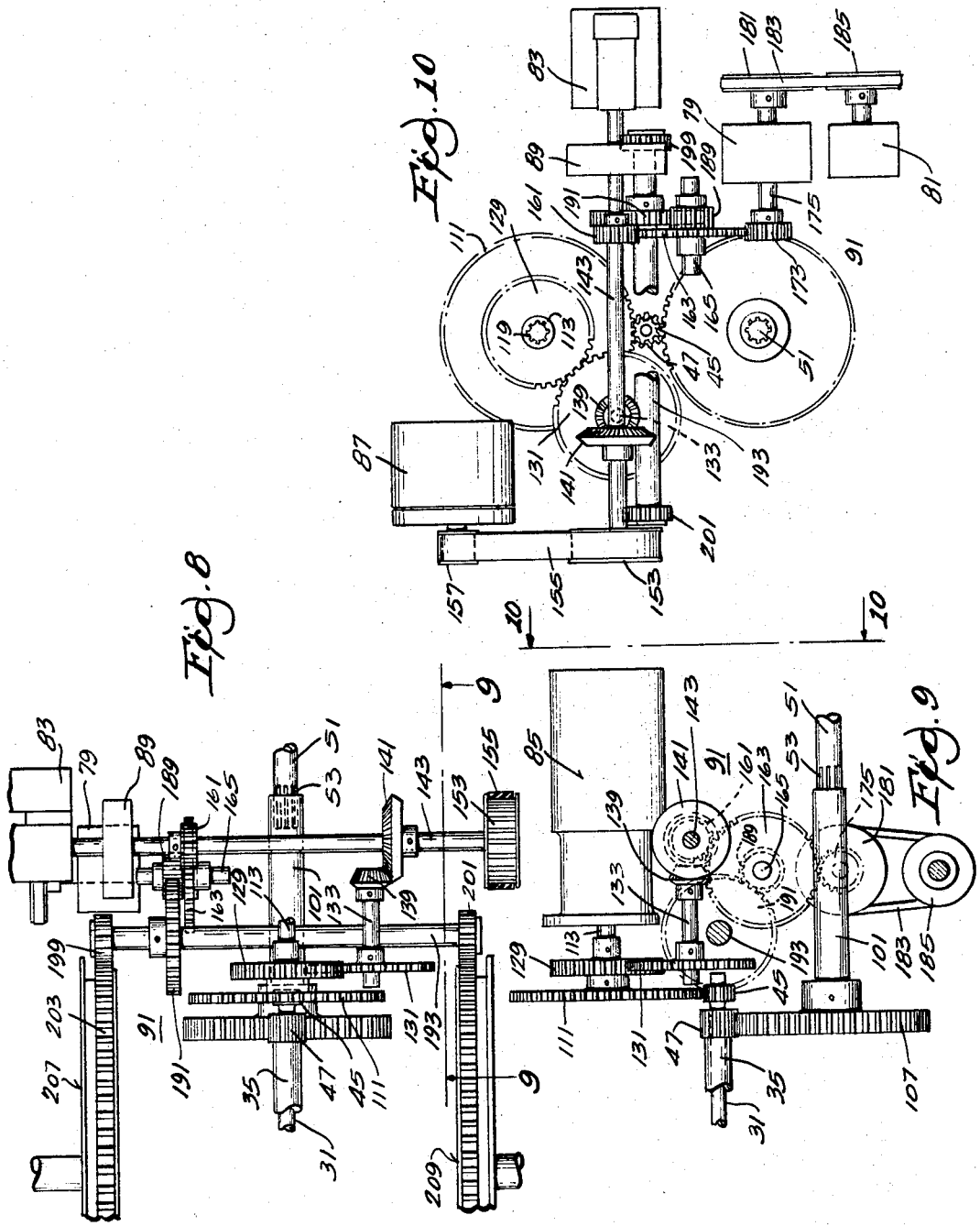
INVENTOR
ROBERT L. TRAPP
BY Wheeler, Wheeler + Wheeler
ATTORNEYS United States Patent Office 3,386,242
Patented June 4, 1968

3,386,242
ENGINE
Robert L. Trapp, Milwaukee, Wis., assignor to Outboard Marine Corporation, Waukegan, Ill., a corporation of Delaware
Filed Oct. 23, 1965, Ser. No. 503,878
10 Claims. (Cl. 60—39.16)

ABSTRACT OF THE DISCLOSURE

Disclosed herein is a turbine driven marine propulsion device including a turbine unit, a gear box, and a stern drive unit. The marine propulsion device is arranged and designed so that the stern drive unit may be removed as a whole from the gear box and so that the gear box, together with various accessories carried thereon, can be removed as a whole from both the stern drive unit and the turbine unit.

---

The invention relates generally to turbine power plants.

The invention provides a turbine power plant including a turbine unit, a unit which consumes the net power output of the power plant, and an intermediate unit comprising a gear box which is detachably connected between and removable bodily from between the turbine unit and the power consuming unit and which includes means for transmitting power from the turbine unit to the power consuming unit, said power transmitting means being disengageably drivingly connectable to the turbine unit and the power consuming unit when the gear box is connected to said units.

The invention also resides in the construction of said gear box, in the incorporation in said gear box of an accessory gear train, and in the mounting on the gear box of various engine accessories such as an oil pump, a starter motor, an electrical energy generating means such as an alternator or generator, a water pump, a fuel control device, and the like.

The invention also provides for such a gear box which, in response to attachment thereof to the turbine unit, provides for driving engagement between the accessory gear train and a first rotor shaft carried by the turbine unit and between the power transmission means and a second rotor shaft carried by the turbine unit and located in telescopic relation to the first rotor shaft.

The invention further specifically provides for a marine propulsion turbine power plant incorporatting a stern drive unit as the power consuming unit. In this regard, the detachability of the gear box from both the turbine unit and the stern drive unit facilitates removal of either or both of these units without affecting the mounting of the stern drive unit. Other objects, advantages, and features of the invention will become known by reference to the following description and the accompanying drawings in which:

FIGURE 1 is a side elevational view of a turbine powered marine propulsion plant embodying various of the features of the invention;

FIGURE 2 is a partial, enlarged top plan view, partly broken away and in section, of the turbine marine propulsion plant shown in FIGURE 1;

FIGURE 3 is a partially broken away and fragmentary sectional view taken generally along line 3—3 of FIGURE 2;

FIGURE 4 is a sectional view taken substantially along line 4—4 of FIGURE 2 with the web member or spider removed;

FIGURE 5 is a view similar to FIGURE 4 showing the front of the intermediate unit with the spider in place;

FIGURE 6 is a partially broken away end view of the intermediate unit taken generally along line 6—6 of FIGURE 2;

FIGURE 7 is an enlarged, fragmentary sectional view of the pilot connection between the intermediate unit and the turbine unit;

FIGURE 8 is a diagrammatic plan view of the gear train embodied in the intermediate unit incorporated in the turbine marine propulsion plant shown in FIGURE 1;

FIGURE 9 is a diagrammatic view taken generally along line 9—9 of FIGURE 8;

FIGURE 10 is a diagrammatic view taken generally along line 10—10 of FIGURE 9; and FIGURE 11 is a perspective view of the intermediate unit with various of the auxiliary devices removed.

Shown in FIGURE 1 of the drawings is a turbine power plant 11 including a turbine unit 13, a power consuming unit 15, and an intermediate unit 17 located between and detachably connected to the turbine unit 13 and the power consuming unit or device 15. While the invention is not so limited, the disclosed arrangement has particular advantage in connection with marine propulsion units wherein the power consuming device 15 is a stern drive unit.

Considering the construction in greater detail, the turbine unit includes a main frame or housing 21 including a rear bearing support 23 (see FIGURE 3). Rotatably supported on forward and rearward bearings 25 and 402, carried respectively by the frame or housing 21 and second stage nozzle 403 is a first stage rotor 29 and connected output shaft 31. While various arrangements can be employed, the disclosed construction also includes a second stage rotor 33 and connected output shaft 35 which is carried on bearings 27 and is located telescopically on the first stage output shaft 31. Forwardly of the first stage rotor 29, the first stage output shaft 31 is connected to an air compressor 37 which delivers air through passages 38 (see FIGURE 2) to a combustion chamber 39 through a pair of heat exchanging devices 41 and 43. At its rearward end, the first stage output shaft 29 has mounted thereon a pinion 45. Forwardly of the pinion 45, the second stage output shaft 35 terminates and also has mounted thereon a pinion 47.

The stern drive unit 15 is generally of known construction and includes several support arms 49 (see FIGURE 1) affording support from a boat transom or from other structural hall members. Rotatably supported in the stern drive unit is a driveshaft 51 having, at its forward end, a splined portion 53 (see FIGURE 3). The stern drive unit 15 is detachably connected to the intermediate unit 17 by suitable means including bolts (see FIGURE 2).

The intermediate unit or gear box comprises a main or housing member 71 which is detachably connected to the frame 21 of the turbine unit 13 by suitable means such as bolts 73. Connected to the rearward part of the housing member 71 and forming a part of the intermediate unit 17 is a combination cover plate and spacer 75. Mounted on the front part of the housing member 71 is a spider or web member 77 which, like the cover plate 75, is unitarily removable with the housing member 71 when the intermediate unit 17 is detached from the turbine unit 13.

Carried or supported by the intermediate unit 17 is power shafting to the stern drive unit, various devices which are auxiliary to the turbine and which are drivingly connected thereto, such as, for instance, an oil pump 79 (see FIGURE 6), a water pump 81, a fuel pump and regulator 83, a starting motor 85, an electrical energy generating device such as an alternator 87, and an air-oil separator 89, together with an accessory gear train or drive train 91 connected to said devices, which drive train also includes shafting affording driving of the heat exchangers 41 and 43 (see FIGURE 2).

More specifically, power is transmitted from the turbine unit 13 to the driveshaft 51 in the stern drive unit 15, by a power transmission drive including a power shaft 101 (see FIGURE 3) which is journalled at its forward end by a bearing 103 supported by the spider 77, and which is journalled at its rearward end by a bearing 105 supported by the housing member. Adjacent its forward end, the power shaft 101 includes means for receiving power in the form of a gear 107 which is detachably meshed with the pinion 47 on the second stage output shaft 35. At its rearward end, the power shaft 101 includes means for transferring power in the form of a splined socket 109 adapted to removably receive the splined portion 53 of the lower unit driveshaft 51, thereby affording ease of disconnection between the intermediate unit 17 and the stern drive unit 15. The socket 109 and splined shaft portion 53 constitute one form of means detachably connecting the power shaft 101 and the driveshaft 51. Other arrangements can also be employed.

The various auxiliary devices are all driven from the first stage output pinion 45 through the drive train 91. Specifically, the drive train 91 includes means for receiving power in the form of a first gear 111 which is detachably meshed with the first stage output shaft pinion 45 and which is carried on a fore and aft accessory shaft 113 journalled in a bearing 115 supported by the spider 77 and a bearing 117 supported by the housing member 71. The rearward end of the shaft 113 includes a splined socket 119 affording detachable connection with a shaft 121 of the starting motor 85 which is located on the exterior of the intermediate unit 17 and removably connected by bolts 123.

As can also be seen from FIGURE 3, the housing member includes a pilot bore 125 and the starting motor 85 includes a mating surface 127 to afford proper axial alignment of the starting motor 85 with the shaft 113.

Also carried on the shaft 113 is another spur gear 129 which, as shown in FIGURE 4, is meshed with still another gear 131 carried on a second fore and aft shaft 133 journalled at its forward end in a bearing 135 (see FIGURE 5) supported by the spider 77. Intermediate its ends, the shaft 133 is journalled by a bearing 137 (see FIGURE 2) supported by the housing member 71. Carried on the rear end of the shaft 133 is a bevel gear 139 meshed with another bevel gear 141 mounted on a cross shaft 143 (see FIGURE 6) journalled inwardly of its ends in bearings 145 and 147 respectively supported by the side wall 151 and a wall portion 171 of the housing member 71 (see FIGURES 4, 5 and 6). Exteriorly of the housing member, and adjacent to one of its ends (see FIGURE 6), the shaft 143 carries a pulley 153 which is connected by a belt 155 to another pulley 157 constituting a part of the alternator 87. The alternator 87 is carried by the housing member 71 on an adjustable bracket 159. Exteriorly of the housing member 71 and adjacent its other end, the shaft 143 is connected to the air-oil separator 89 and to the fuel pump and regulator 83.

Between the side walls 149 and 151 of the housing member, the shaft 143 carries (see FIGURE 6) a spur gear 161 in mesh with a gear 163 carried on a cross shaft 165 journalled in a bearing 167 in the side wall and by a bearing 169 in the wall portion 171 of the housing member 71. The gear 163 also meshes (see FIGURE 6) with a gear 173 carried on another cross shaft 175 which is located immediately below the cross shaft 165, which extends through a pilot opening 174 in the wall 149 to the outside of the housing member 71, and which constitutes a part of the oil pump 79 on the exterior of the housing member 71. If desired, the shaft 165 could be journalled in bearings in the walls 149 and 171 and suitably connected exteriorly of the housing member 71 to the oil pump. The oil pump 79 also includes a pulley 181 on the shaft 175, which pulley is connected by a belt 183 to a pulley 185 on the water pump 81 for driving thereof. The water pump 81 is removably and adjustably mounted on the cover plate 75 by bolts 187 as shown in FIGURE 6.

Also carried on the beforementioned cross shaft 165 (see FIGURE 2) is a pinion 189 which is meshed with a gear 191 on another cross shaft 193 journaled inwardly of its ends by bearings 195 and 197 respectively located in the side walls 149 and 151 of the housing member 71. The shaft 193 carries adjacent its ends respective pinions 199 and 201 meshing with gear surfaces 203 and 205 on the periphery of respective heat exchanging wheels or rotors 207 and 209 constituting components of the respective heat exchanging devices 41 and 43. As a result of this connection, the rotors 207 and 209 are driven so as to afford heating of the incoming combustion air traveling through the passages 38 toward the combustion chamber 39 incident to air passage through the rotors which have previously been heated in response to exhaust gas passage therethrough.

From the foregoing, it is apparent that the drive train 91 supported by the intermediate unit 17 can be readily connected and disconnected to the output pinions 45 and 47 and to the heat exchanging wheels 207 and 209 by movement of the intermediate unit 17 relative to and in directions axially of the turbine output shafts 31 and 35. The intermediate unit 17 and stern drive unit 15 can be similarly connected and disconnected.

Suitable pilot means are provided in order to assure proper alignment between the intermediate unit 17 and the turbine unit 13. Specifically, the rear bearing support 23 is provided as shown in FIGURE 7, with a pilot collar 221 which is receivable in a mating bore 223 in the spider 77. In addition, the turbine output shaft 31 is additionally supported rearwardly of the output pinion 45 by receipt of the first stage output shaft 31 into a bearing 225 (see FIGURE 2) supported in a part 227 of the housing member 71. Pilot means can also be employed, if desired, in the connection between the intermediate unit 17 and the power consuming unit 15, and in connection with various of the auxiliary devices, as already indicated with respect to the starting motor 85.

The intermediate unit 17 is provided with a lubricating system which includes the oil pump 79 and an oil filter 231 (see FIGURE 1) supported on the housing member 71 and which affords lubrication of the bearings and gears. Apart from the presence of the lubricating system, the details of this system are not a part of the invention disclosed herein.

The disclosed arrangement affords driving of all of the auxiliary devices by one of the stages of the two-stage turbine unit 13. This arrangement provides for continued power supply to the accessories under idle conditions when the first stage rotor continues to produce power output and when the second stage rotor develops minimum power. The disclosed arrangement also permits ready assembly and disassembly of the overall turbine plant into its main constituent parts to afford ease of manufacture and maintenance.

Various of the features of the invention are set forth in the following claims.

What is claimed is:

1. The combination of a turbine engine having a housing, first and second stage shafts, and means telescopically and rotatably mounting said first and second stage shafts with said first stage shaft extending beyond said second stage shaft, a gear box having a main housing member fixed to said turbine housing, a spider extending from said main housing member toward said turbine housing, a driveshaft, bearings on said member and on said spider rotatably mounting said drive-shaft in said gear box in parallel relation to said first and second stage shafts, gearing drivingly connecting said second stage shaft and said driveshaft intermediate said driveshaft bearings, a first accessory shaft, bearings on said member and on said spider rotatably mounting said first accessory shaft in said gear box in parallel relation to said first and second stage shafts, gearing drivingly connecting said first stage shaft and said first accessory shaft intermediate said first accessory shaft bearings, a second accessory shaft, bearings on said member and on said spider rotatably mounting said second accessory shaft in said gear box in parallel relation to said first accessory shaft, gearing drivingly connecting said first and second accessory shafts, a third accessory shaft, bearings on said member mounting said third accessory shaft in transverse relation to said first and second accessory shafts, bevel gearing drivingly connecting said second and third accessory shafts, a fourth accessory shaft, bearings on said member rotatably mounting said fourth accessory shaft in parallel relation to said third accessory shaft, gearing drivingly connecting said third and fourth accessory shafts, a fifth accessory shaft, bearings on said member rotatably mounting said fifth accessory shaft in parallel relation to said third accessory shaft, gearing drivingly connecting said third and fifth accessory shafts, rotatable heat exchanging wheels supported by said turbine housing on opposite sides theerof, driving connections between said fifth accessory shaft and each of said wheels, a starting motor supported by said gear box and drivingly connected to said first accessory shaft, a fuel control device supported by said gear box and drivingly connected to said third accessory shaft, and an oil pump supported by said gear box and drivingly connected to said fourth accessory shaft.

2. A gear box comprising a housing member and a spider extending from said housing member, a driveshaft, means on said driveshaft for receiving power and for transferring power bearings on said member and on said spider rotatably mounting said driveshaft in said gear box, first and second accessory shafts, bearings on said member and on said spider respectively rotatably mounting said first and second accessory shafts in said gear box in parallel relation to said driveshaft, meshed gearing drivingly connecting said first and second accessory shafts, third and fourth accessory shafts, bearings on said member respectively rotatably mounting said third and fourth accessory shafts in parallel relation to each other and in transverse relation to said first and second accessory shafts, meshed bevel gearing drivingly connecting said second and third accessory shafts, and meshed gearing drivingly connecting said third and fourth accessory shafts.

3. A gear box comprising a housing member and a spider extending from said housing member, a driveshaft, means on said driveshaft for receiving and for transferring power bearings on said member and on said spider rotatably mounting said driveshaft in said gear box, first and second accessory shafts, means on said first accessory shaft for receiving power, bearings on said member and on said spider respectively rotatably mounting said first and second accessory shafts in said gear box in parallel relation to said drifeshaft, meshed gearing drivingly connecting said first and second accessory shafts, third and fourth accessory shafts, bearings on said member respectively rotatably mounting said third and fourth accessory shafts in parallel relation to each other and in transverse relation to said first and second accessory shafts, meshed bevel gearing drivingly connecting said second and third accessory shafts, meshed gearing drivingly connecting said third and fourth accessory shafts, a starting motor supported by said housing and drivingly connected to said first accessory shaft, a fuel pump supported by said housing and drivingly connected to said third accessory shaft, and an oil pump supported by said housing and drivingly connected to said fourth accessory shaft.

4. A gear box comprising a housing member and a spider extending from said housing member, a driveshaft having thereon a gear for receiving power and means for transferring power, bearings on said member and on said spider rotatably mounting said driveshaft in said gear box with said gear intermediate said spider and said member, a first accessory shaft having thereon a gear for receiving power, bearings on said member and on said spider rotatably mounting said first accessory shaft in said gear box in parallel relation to said driveshaft and with said first accessory shaft gear intermediate said spider and said member, a second accessory shaft, bearings on said member and on said spider rotatably mounting said second accessory shaft in said gear box in parallel relation to said first accessory shaft, meshed gearing drivingly connecting said first and second accessory shafts, a third accessory shaft, means on said member mounting said third accessory shaft in transverse relation to said first and second accessory shafts, meshed bevel gearing drivingly connecting said second and third accessory shafts, a fourth accessory shaft, bearings on said member rotatably mounting said fourth accessory shaft in parallel relation to said third accessory shaft, gearing drivingly connecting said third and fourth accessory shafts, a fifth accessory shaft, bearings on said member rotatably mounting said fifth accessory shaft in parallel relation to said third accessory shaft, and gearing drivingly connecting said third and fifth accessory shafts.

5. The combination of a turbine engine including a housing, a gear box including an accessory train, bearings mounting said accessory train in said gear box in position for driving connection of said gear train with said turbine engine when said gear box is connected to said housing, a power transmission drive, and bearings mounting said power transmission drive in said gear box in position for driving connection of said power transmission drive with said turbine engine when said gear box is connected to said housing, means for detachably connecting said housing and said gear box so as to permit driving connection of said gear train and said power transmission drive with said engine incident to the connection of said gear box to said housing and so as to permit removal of said gear box including said gear train and said power transmission drive as an assembled unit from said turbine engine housing incident to disconnection of said gear box from said housing, a stern drive unit including a drive shaft and bearings rotatably mounting said drive shaft in position for driving connection of said power transmission drive with said drive shaft when said stern drive unit is connected to said gear box, and means detachably connecting said stern drive unit and said gear box so as to permit driving connection of said power transmission drive and said drive shaft incident to connection of said stern drive unit and said gear box and so as to permit removal of said stern drive unit as a whole from said gear box incident to disconnection of said stern drive unit and said gear box.

6. The combination of a turbine engine having a housing, inner and outer rotor shafts each having, at one end, respective pinions, a gear box, bearings on said housing and said gear box rotatably mounting said rotor shafts in concentric relation to each other with said pinions in adjacently spaced relation to each other when said gear box is connected to said housing, said gear box also including an accessory gear train including a gear, bearings mounting said accessory gear train in position for meshing engagement drivingly connecting said gear with said pinion on said inner shaft when said gear box is connected to said housing, a power transmission drive including a gear, bearings mounting said power transmission drive in position for meshing engagement drivingly connecting said last mentioned gear with said pinion on said outer shaft when said gear box is connected to said housing, means for detachably connecting said housing and said gear box so as to afford driving connection of said gear train and said power transmission drive with said engine incident to connection of said gear box to said housing and so as to permit removal of said gear box and said gear train and said power transmission drive as an assembled unit from said housing incident to disconnection of said gear box from said housing, a stern drive unit including a drive shaft and bearings rotatably mounting said drive shaft, mating splined connection means on each of said power transmission drive and said drive shaft to permit driving engagement therebetween when said stern drive unit is connected to said gear box, and means detachably connecting said stern drive unit and said gear box so as to permit driving engagement between said power transmission drive and said drive shaft incident to connection of said stern drive unit and said gear box and so as to permit removal of said stern drive unit as a whole from said gear box incident to disconnection of said stern drive unit and said gear box.

7. The combination of a turbine engine having a housing including a main frame and an end plate, a gear box including a main housing member and a spider member, pilot means in said spider member and said end plate for cooperating engagement when said gear box is connected to said housing, inner and outer rotor shafts, each having, at one end, respective pinions, bearings on said housing and said gear box for rotatably mounting said rotor shafts in concentric relation to each other with said pinions in adjacent relation to each other when said gear box is connected to said housing, said gear box also including an accessory train comprising a gear, bearings mounting said accessory train in position for meshing engagement drivingly connecting said gear with said pinion on said inner shaft when said gear box is connected to said housing, a power transmission drive including a gear, and bearings mounting said power transmission drive in position for meshing engagement drivingly connecting said last mentioned gear with said pinion on said outer shaft when said gear box is connected to said housing, and means detachably connecting said housing and said gear box so as to permit cooperating engagement of said pilot means and connection of said accessory gear train and said power transmission drive with said rotor shafts incident to connection of said gear box to said housing and so as to permit removal of said gear box, said accessory gear train and said power transmission drive as an assembled unit from said housing incident to disconnection of said gear box from said housing.

8. The combination of a turbine engine having a housing, concentrically located first and second rotor shafts, one of said rotor shafts having thereon gearing, a gear box adapted to be removably connected to said housing and including thereon an accessory gear train having gearing for meshing engagement drivingly connecting said gearing on said one rotor shaft when said gear box is connected to said housing, an oil pump mounted on the exterior of said gear box and driven by said accessory gear train, a fuel pump mounted on the exterior of said gear box and driven by said accessory gear train, a water pump mounted on the exterior of said gear box and driven by said accessory gear train, and means for detachably connecting said gear box to said housing so as to permit driving connection of said gear train and said rotor gearing incident to connection of said gear box to said housing and so as to permit removal of said gear box and said accessory gear train, together with said oil pump, said fuel pump and said water pump as an assembled unit from said housing incident to disconnection of said gear box from said housing.

9. The combination of a turbine engine having a housing, concentrically located first and second rotor shafts, one of said rotor shafts having thereon gearing, a gear box adapted to be removably connected to said housing and including thereon an accessory gear train having gearing for meshing engagement drivingly connecting said gearing on said one rotor shaft when said gear box is connected to said housing, an oil pump mounted on the exterior of said gear box and driven by said accessory gear train, a fuel pump mounted on the exterior of said gear box and driven by said accessory gear train, a starting motor mounted on the exterior of said gear box and connectable with said accessory gear train, electrical energy generating means mounted on the exterior of said gear box and driven by said accessory gear train, a water pump mounted on the exterior of said gear box and driven by said accessory gear train, and means for detachably connecting said gear box to said housing so as to permit driving connection of said accessory gear train to said gearing on said one rotor shaft incident to connection of said gear box to said housing and so as to afford removal of said gear box and said accessory gear train, together with said oil pump, said fuel pump, said starting motor, said electrical energy generating means, and said water pump as an assembled unit from said housing incident to disconnection of said gear box from said housing.

10. The combination of a turbine engine having a housing, concentrically located first and second rotor shafts, one of said rotor shafts having thereon gearing, a gear box adapted to be removably connected to said housing and including thereon an accessory gear train having gearing for meshing engagement drivingly connecting said gearing on said one rotor shaft when said gear box is connected to said housing, an oil pump mounted on the exterior of said gear box and driven by said accessory gear train, a fuel control device mounted on the exterior of said gear box and driven by said accessory gear train, a starting motor mounted on the exterior of said gear box and connectable with said accessory gear train, electrical energy generating means mounted on the exterior of said gear box and driven by said accessory gear train, a water pump mounted on the exterior of said gear box and driven by said accessory gear train, an air oil separator mounted on the exterior of said gear box and driven by said accessory gear train, rotary heat exchanging means mounted on said housing, driving connections extending between said accessory gear train and said rotary heat exchanging means when said gear box is connected to said housing, and means for detachably connecting said gear box to said housing so as to permit driving connection of said gear train and said rotor gearing incident to connection of said gear box to said housing and so as to permit removal of said gear box and said accessory gear train, together with said oil pump, said fuel control device, said starting motor, said electrical energy generating means, said air-oil separator, and said water pump as an assembled unit from said housing incident to disconnection of said gear box from said housing.

References Cited

UNITED STATES PATENTS

| | | | |
|---|---|---|---|
| 2,849,896 | 9/1958 | Lappin et al. | 74—665 |
| 3,023,577 | 3/1962 | Williams et al. | 60—39.16 X |
| 3,077,074 | 2/1963 | Collman et al. | 60—39.16 X |
| 3,100,378 | 8/1963 | Austin et al. | 60—39.16 X |
| 3,116,908 | 1/1964 | Wosika | 60—39.16 X |
| 3,266,248 | 8/1966 | Leslie | 60—39.16 X |
| 3,271,949 | 9/1966 | Jones et al. | 60—39.16 X |

DONLEY J. STOCKING, *Primary Examiner.*

J. C. BENEFIEL, A. T. McKEON,
*Assistant Examiners.*

UNITED STATES PATENT OFFICE
CERTIFICATE OF CORRECTION

Patent No. 3,386,242

June 4, 1968

Robert L. Trapp

It is certified that error appears in the above identified patent and that said Letters Patent are hereby corrected as shown below:

Column 5, line 20, "theerof" should read -- thereof --; line 33, after "shafts," insert -- means on said first accessory shaft for receiving power, --; line 55, "drifeshaft" should read -- driveshaft --.

Signed and sealed this 25th day of November 1969.

(SEAL)
Attest:

Edward M. Fletcher, Jr.
Attesting Officer

WILLIAM E. SCHUYLER, JR.
Commissioner of Patents